United States Patent
Knieper

(10) Patent No.: US 7,150,481 B2
(45) Date of Patent: Dec. 19, 2006

(54) CONVERTIBLE VEHICLE

(75) Inventor: Karl Knieper, Osnabruck (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/710,896

(22) Filed: Aug. 11, 2004

(65) Prior Publication Data

US 2005/0035617 A1 Feb. 17, 2005

(30) Foreign Application Priority Data

Aug. 14, 2003 (DE) ............................... 103 37 473

(51) Int. Cl.
*B60R 5/04* (2006.01)
(52) U.S. Cl. ................................. 296/24.4
(58) Field of Classification Search ............. 296/24.4, 296/107.08, 37.1, 37.5, 37.16
See application file for complete search history.

(56) References Cited

U.S. PATENT DOCUMENTS

| 1,809,505 | A | * | 6/1931 | Campbell | 296/107.08 |
|---|---|---|---|---|---|
| 3,800,990 | A | * | 4/1974 | Richardson | 224/541 |
| 4,536,025 | A | * | 8/1985 | Yamawaki et al. | 296/37.16 |
| 4,749,226 | A | * | 6/1988 | Heft | 296/37.6 |
| 4,969,679 | A | * | 11/1990 | Eyb | 296/124 |
| 5,649,733 | A | * | 7/1997 | Seel et al. | 296/37.5 |
| 5,810,413 | A | * | 9/1998 | Siring et al. | 296/37.5 |
| 6,401,995 | B1 | * | 6/2002 | Yuille et al. | 224/404 |
| 6,536,826 | B1 | * | 3/2003 | Reed | 296/37.5 |
| 6,623,060 | B1 | * | 9/2003 | Gehring et al. | 296/37.5 |
| 6,688,669 | B1 | * | 2/2004 | Foelster et al. | 296/107.01 |
| 2003/0071039 | A1 | * | 4/2003 | Spykerman et al. | 220/6 |

FOREIGN PATENT DOCUMENTS

| DE | 43 30 411 | 10/1994 |
|---|---|---|
| DE | 101 31 886 | 1/2003 |

* cited by examiner

*Primary Examiner*—H Gutman
(74) *Attorney, Agent, or Firm*—Gudrun E. Huckett

(57) ABSTRACT

A convertible vehicle has a rear area with a storage compartment for stowing the top located adjacent to the trunk. A variable partitioning device separates the trunk and the storage compartment. The partitioning device has a top receiving position and a luggage receiving position. The partitioning device has a panel-shaped end member that, in the top receiving position, is in an upright position and delimits rearwardly the storage compartment relative to the trunk. An adjoining panel is connected to the end member. The end member is releasably secured to the carbody. For moving the partitioning device into the luggage receiving position, the end member is detached from the carbody and pivoted relative to the adjoining panel by a forwardly oriented movement. Subsequently, the end member and the adjoining panel are moved together by a second forwardly oriented movement.

10 Claims, 6 Drawing Sheets

CONVERTIBLE VEHICLE

BACKGROUND OF INVENTION

1. Field of the Invention

The invention relates to a convertible vehicle comprising a storage compartment for stowing the top (roof) in the rear area of the vehicle. The storage compartment is arranged adjacent to the trunk and can be partitioned from the trunk by a variable partitioning device. The partitioning device is movable between a top receiving position, in which the size of the storage compartment is enlarged, and a luggage receiving position, in which the size of the trunk is enlarged. The partitioning device comprises at least a substantially panel-shaped end member that, in the top receiving position, is in an upright position and delimits the storage compartment to the rear. The end member comprises an edge area that can be releasably secured directly or indirectly on the carbody in a detachable way, wherein the edge area for moving the partitioning device into the luggage receiving position is detachable and movable with a movement component oriented in a forward traveling direction of the vehicle.

2. Description of the Related Art

U.S. Pat. No. 5,810,413 discloses a convertible vehicle having a partitioning device between the trunk and the top storage compartment. The partitioning device is comprised of three sequentially arranged rigid panel-shaped elements. The frontmost panel and the rearmost panel, when viewed in the traveling direction of the vehicle, are connected to the carbody. All three parts are pivotable relative to one another. Accordingly, the three panels with four hinges positioned at the edges and in between can form a four-bar mechanism. When forces act on one of the panels, this panel must entrain the other panels. The panels therefore must be rigid and relatively large and heavy because they must transmit pressure forces. Also, the moved panel exerts onto the hinges where the panels are connected to one another pulling or pushing forces so that these hinges not only have to provide purely a pivoting function but must also ensure force transmission between the panels. In accordance with these requirements, the hi8nges must be strong and thus heavy. In the luggage receiving position, the rearward edge of the rearmost panel secured to the carbody remains in its position on the carbody so that the partitioning device cannot move as a whole forwardly but the rearmost panel remains in a horizontal position and the trunk space is therefore limited in the upward direction.

SUMMARY OF INVENTION

It is an object of the present invention to improve a convertible vehicle of the aforementioned kind with regard to a variable partitioning device between the trunk and the storage compartment.

In accordance with the present invention, this is achieved in that, for moving the partitioning device into the luggage receiving position, sequentially the end member is movable relative to an adjoining panel arranged in front of the end member and, subsequently, the adjoining panel is movable together with the end member, that has been pivoted relative to the adjoining panel, with a movement component oriented in the traveling direction of the vehicle.

According to the present invention, as a result of the detachable arrangement of the upper edge area of the end member, it is possible that, for moving the partitioning device into the luggage receiving position, the partitioning device as a whole, i.e., also the area that is farthest to the rear of the vehicle, can be moved in the forward traveling direction so that a space limitation for the luggage to be loaded from the rear is minimized. There is no longer a part that limits the trunk space in the upward direction.

Because of the detachable (releasable) arrangement of the end member, there is no longer a need for a combined movement of a chain of several panels with the correspondingly required force transmission between them. It is now possible and advantageous to move the panels sequentially, or in a fixed position relative to one another, in order to avoid high transmission forces between them. In this way, it is possible to employ lightweight materials and lightweight construction, also with respect to the hinges.

When the end member is pivotable by means of its lower edge area relative to the adjoining panel in front of it, the connection between these two panels can be a simple pivot connection that must not transmit additional forces such as tensile or thrusting forces for a combined movement between several panels. Accordingly, the pivot hinges between these panels can be sized to be rather small.

In particular, the hinges can be film hinges a textile laminate, for example, a carpet laminate, of the panels; in this way, the weight, space requirements, and manufacturing costs of the hinges can be minimized.

A weight optimization of a securing means of the panels relative to one another such that they can be pivoted as a package is possible when employing advantageously a hook and loop fastener.

Despite the fact that the different pivoting steps are sequentially performed, the movement can be carried out especially quickly when only two movable panels are provided.

DETAILED DESCRIPTION

Figure 1:
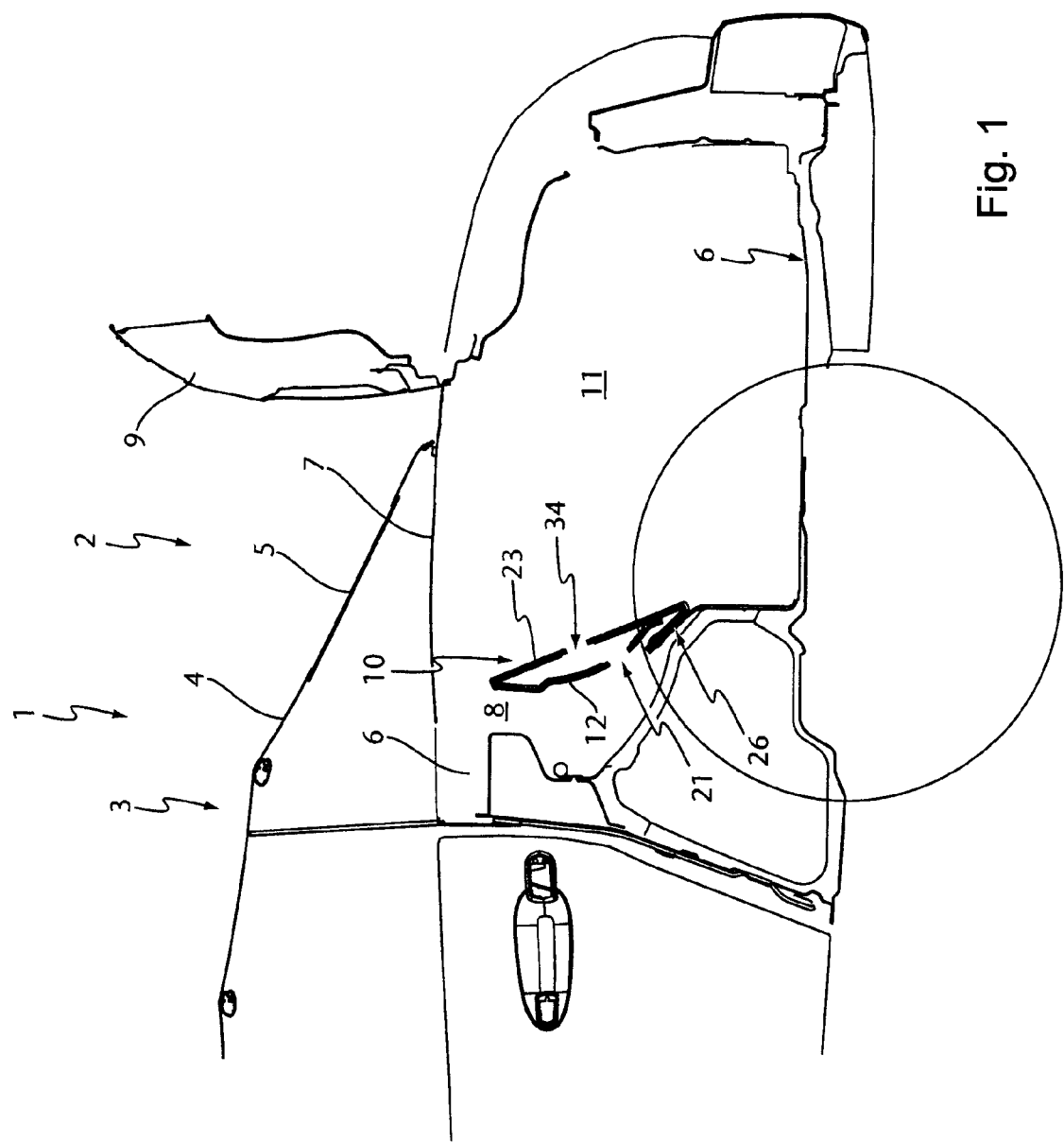
FIG. 1 is a schematic side view of the rear area of a convertible vehicle according to the present invention showing the luggage receiving position.
Figure 2:
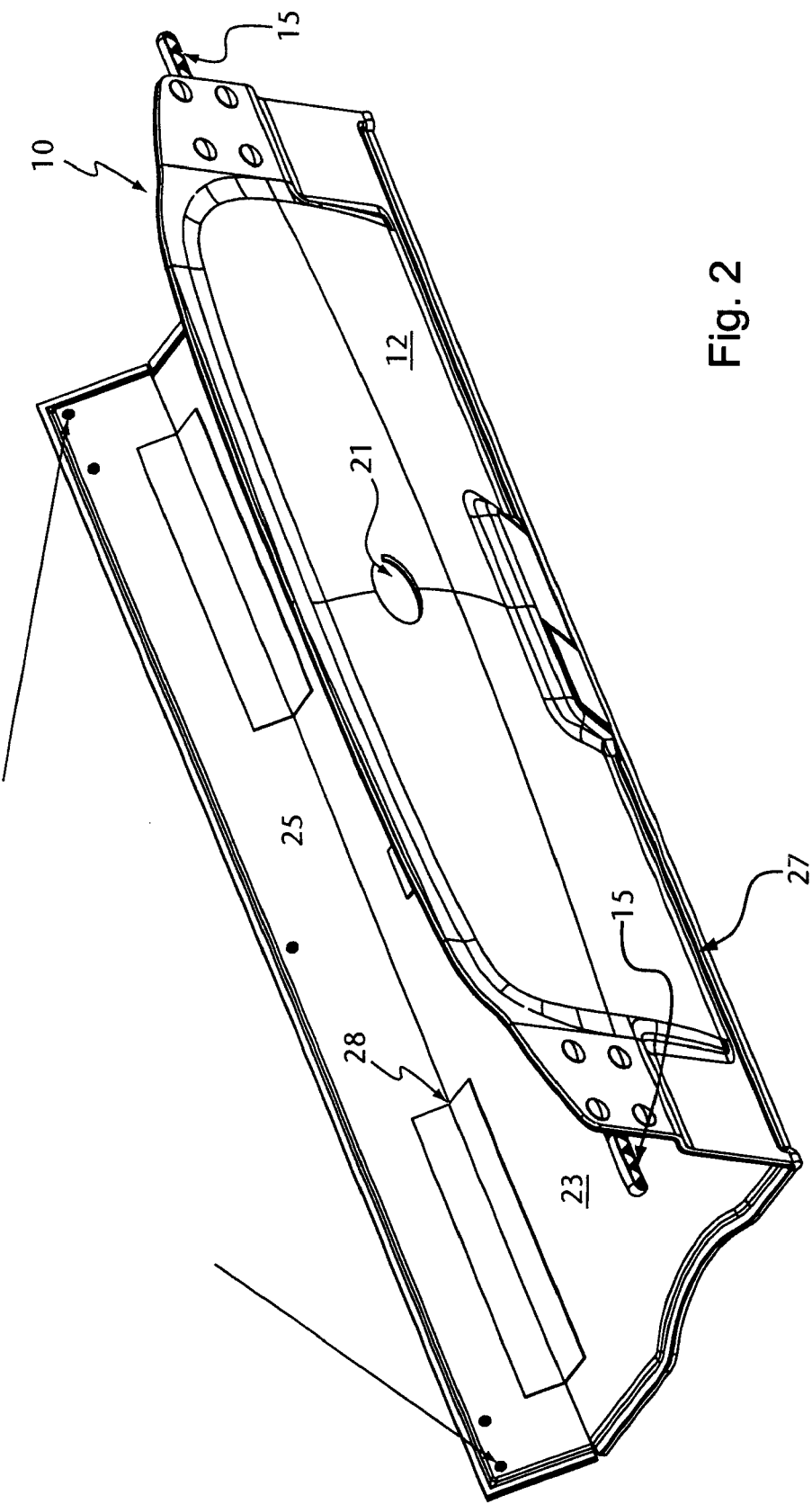
FIG. 2 is a perspective view of the partitioning device in the top receiving position, viewed in a direction at an angle from the rear.

The schematically illustrated trunk area 2 of a convertible vehicle 1 shown in FIG. 1 comprises a movable top (roof) 3 that can be comprised partially or entirely of rigid parts, but can also be entirely in the form of a flexible cover 4, with the exception of the rear window 5. For opening the convertible vehicle, the top 3 can be stored in the carbody 6 below the cover 7 in a storage compartment 8. For this purpose, the cover 7 is connected pivotably to the carbody 6. As illustrated in FIG. 1, it can be a part separate from the trunk lid 9 or can be a unitary part thereof (not shown).

Figure 5:
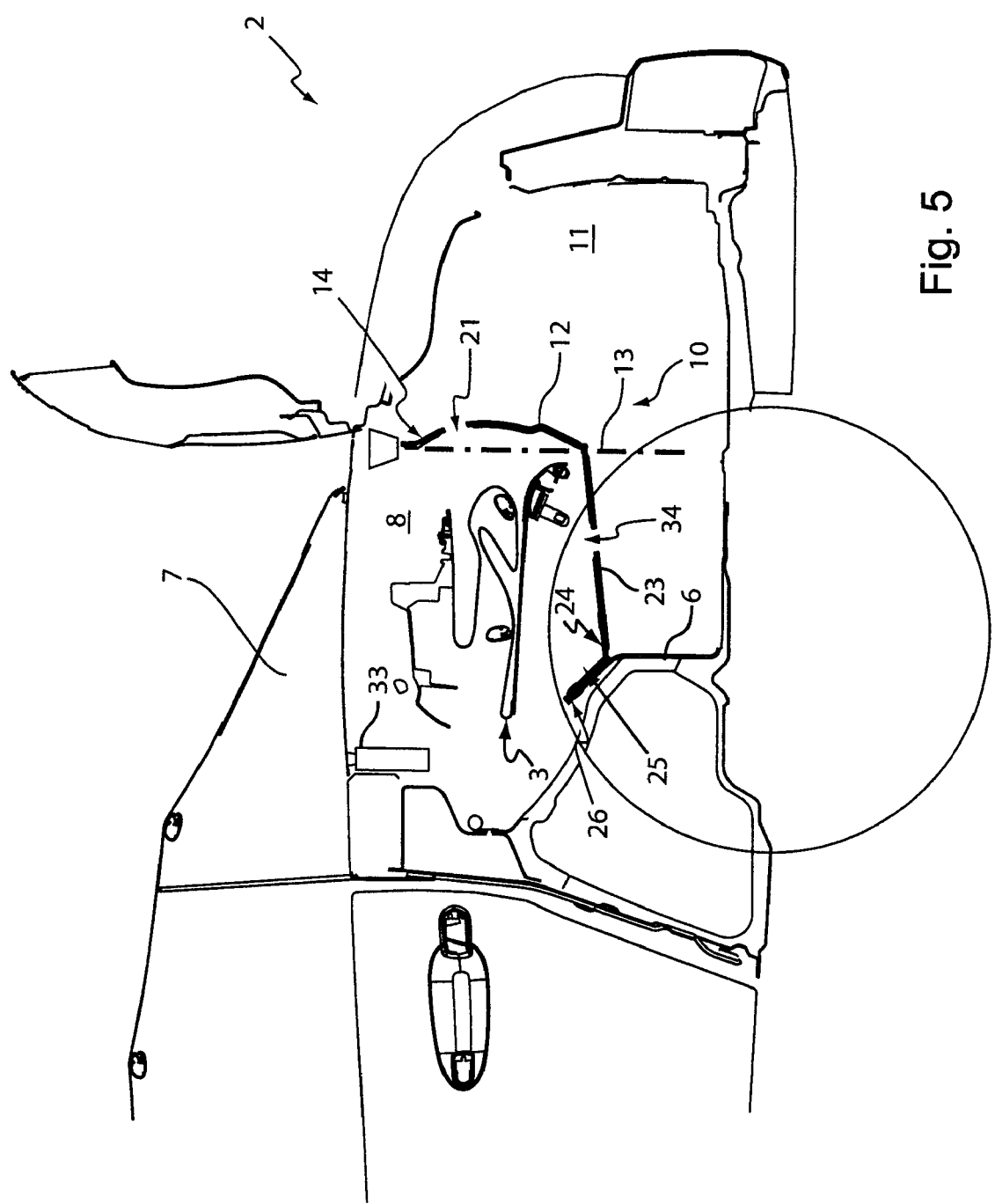
FIG. 5 is a lateral view of the rear area of the vehicle according to the invention showing the partitioning device in the top receiving position.
Figure 7:
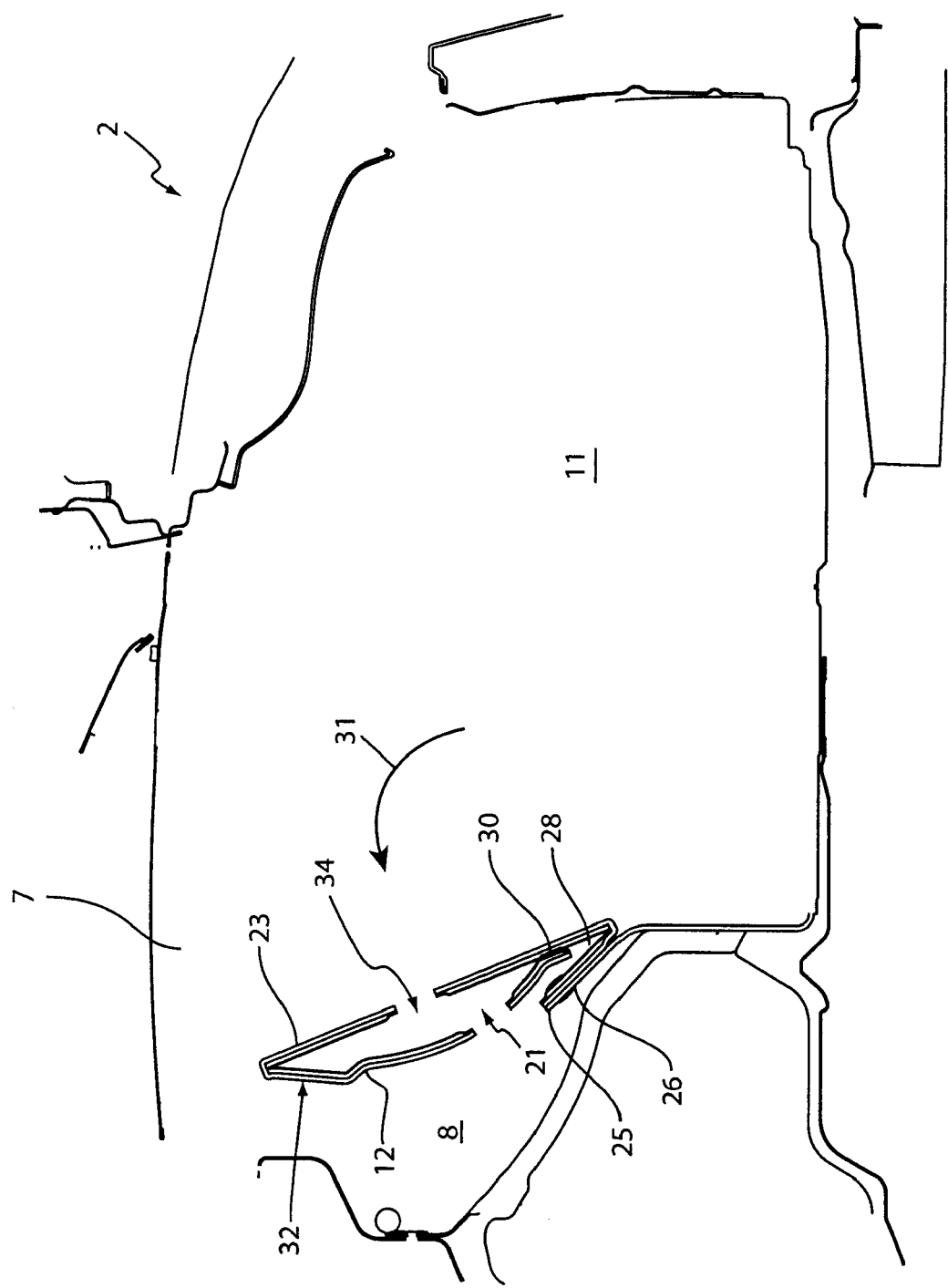
FIG. 7 is a view similar to FIG. 6 showing the luggage receiving position.

The storage compartment 8 is separated by a variable partitioning device 10 from the trunk 11. It is thus possible, for the so-called top receiving position, i.e., the position for stowing the open top 3 in the storage compartment 8, to maximize the size of the storage compartment 8 by reducing the size of the trunk 11 (FIG. 5) and, for the luggage receiving position with the top 3 closed, to maximize the size of the trunk 11 by reducing the size of the storage compartment 8 (FIG. 7).

The partitioning device 10 comprises in the illustrated embodiment a substantially panel-shaped end member 12 that is upright in the top receiving position (FIG. 5), i.e., it is not or only slightly slanted (up to 10 degrees) relative to the vertical 13 and provides in this way a rearward end wall of the storage compartment 8. In this position, the end member 12 is detachably (releasably) connected with its upper edge area 14 to the carbody 6.

Figure 3:
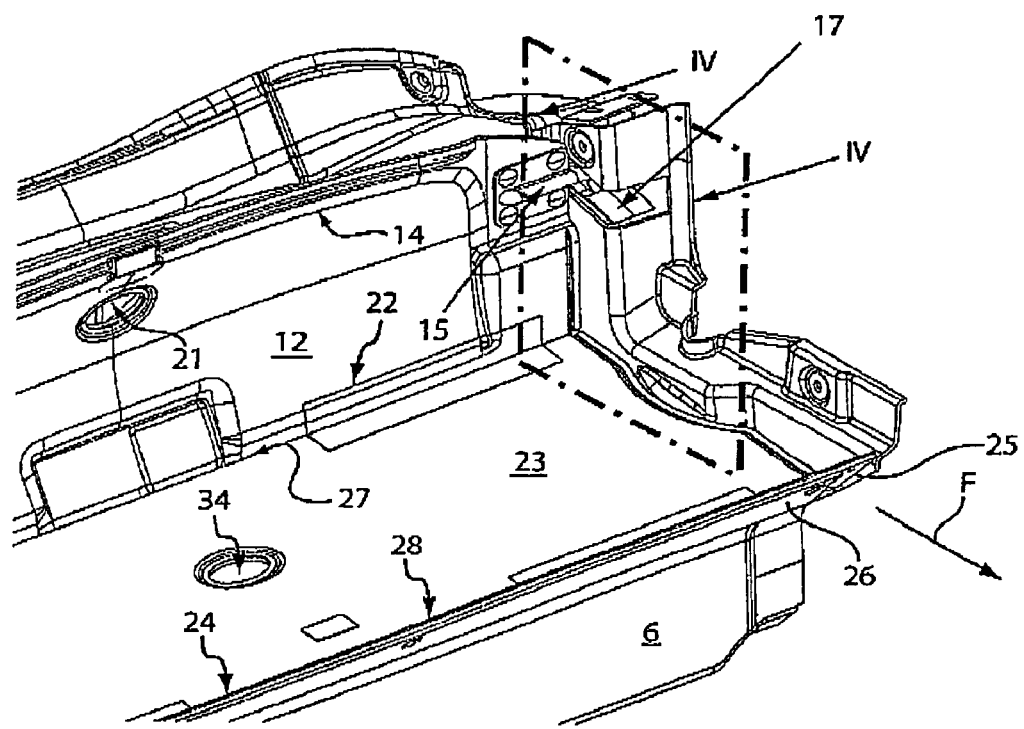
FIG. 3 is a perspective of view of the partitioning device in the position of FIG. 2, viewed in a direction at an angle from the front.
Figure 4:
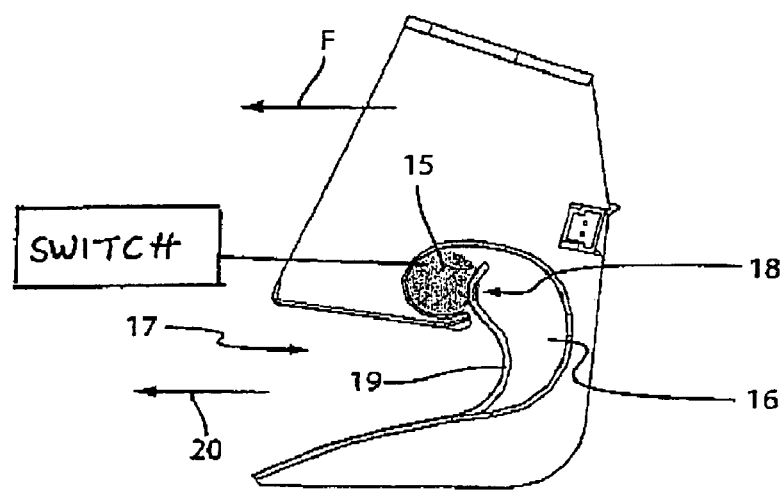
FIG. 4 is a section along the section line IV—IV a FIG. 3.

The detachable or releasable connection is realized by a projecting member, for example, in the form of a laterally extending locking bolt 15 that is provided on each longitudinal side of the vehicle and projects transversely thereto; it is designed to engage a blind bore-type recess 16 on the carbody (FIGS. 3 and 4). As an alternative, or additionally, a central locking bolt correlated with the longitudinal center plane of the vehicle could be provided for securing the end member 12 on the carbody 6. The locking bolt 15, in order to reduce weight, can be manufactured, for example, of fiberglass reinforced plastic material.

The recesses 16 comprise a pocket 18, respectively, that is displaced relative to the engagement passage 17 for the locking bolt 15; the locking bolt 15 can be forced by the spring force of a leaf spring 19 into the recess 16 so that it is secured against being pulled out in the direction of arrow 20.

The release of the connection is realized by pressure acting against the spring force counter to the direction of the arrow 20 and a downward movement of the upper edge area 14; the downward movement can be assisted by the shape of the spring 19. For a manual operation, a passage or opening 21 is provided in the end member 12. An automatic actuation can be made possible also with an appropriate drive and control member.

In any case, a switch can be provided that is mandatorily operated by the engaged locking bolt 15 and, in this way, enables release of the top stowing action; when the switch is not pushed down, opening of the top is blocked. Opening of the top 3 in the luggage receiving position of the partitioning device, shown in FIG. 7, or in an intermediate position (shown in FIG. 6) is prevented in this way.

The lower edge area 22 of the end member 12 is pivotably connected to an adjoining panel 23 that is positioned in front of the end member 12, when viewed in the forward traveling direction F of the vehicle. It forms in the top receiving position according to FIG. 5 a part of the bottom of the storage compartment 8 and is positioned almost horizontally. The forward or leading edge area 24, viewed in the forward traveling direction F of the vehicle, of the adjoining panel 23 is connected pivotably to another panel 25 that, in turn, is not movable but rigidly connected to a transversely extending wall 26 of the carbody 6, for example, by means of a screw connection. Accordingly, only two movable panels 12, 23 are provided.

The panels 12, 23, 25 can be manufactured of a lightweight material, for example, a polypropylene fiberglass composite, such as the product sold under the tradename Symalite (produced by Quadrant Plastic Composites AG, Switzerland).

For a visual improvement, a lamination of the surfaces with needled fleece is provided. The needled fleece can form additional film hinges 27 between the panels 12 and 23 as well as hinges 28 between the panels 23 and 25. These pivot hinges 27, 28 are thus minimized with regard to their weight and size.

Figure 6:
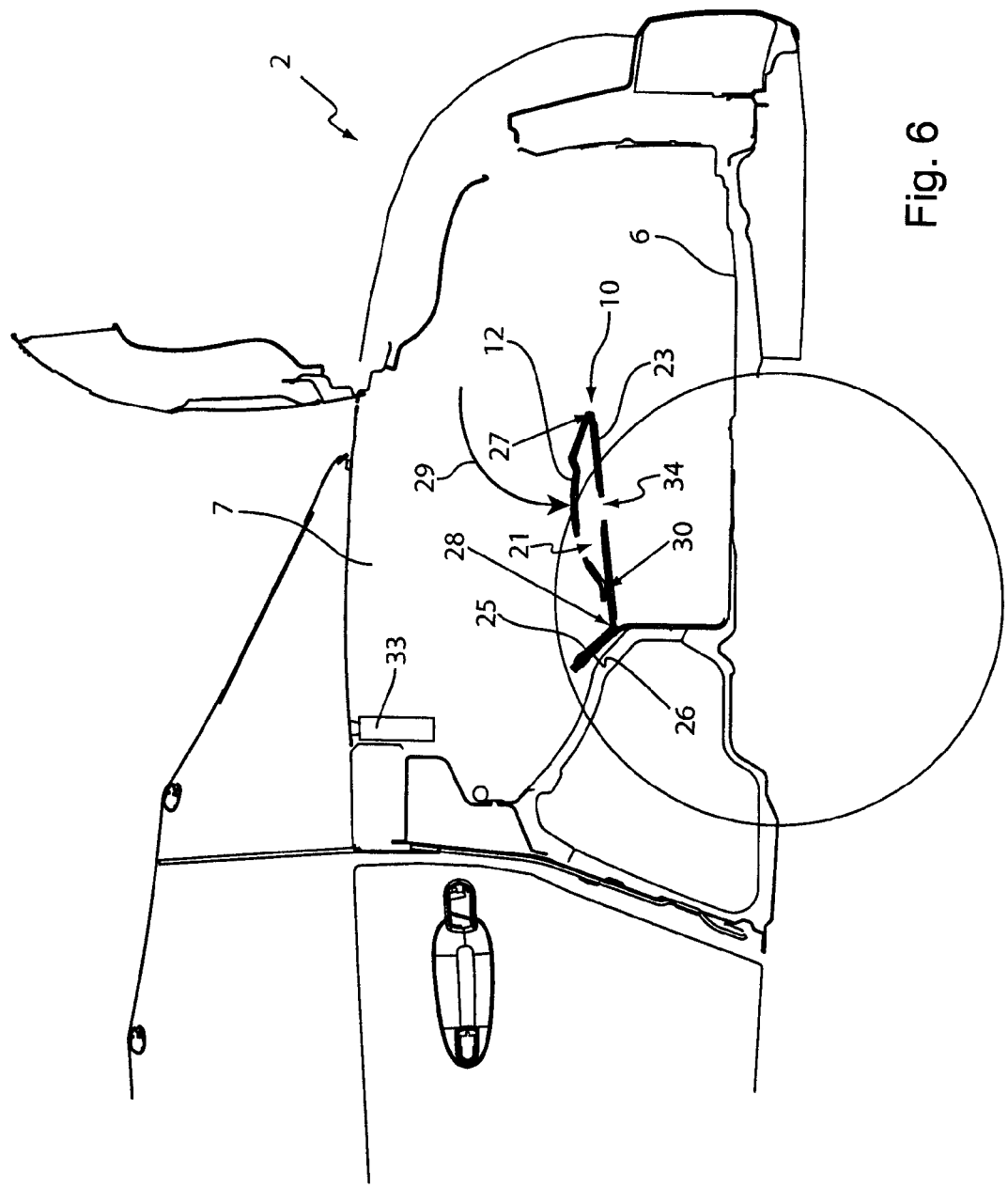
FIG. 6 is a view similar to FIG. 5 but with the end member pivoted forwardly and downwardly during the transfer from the top receiving position into the luggage receiving position.

In order to transfer the partitioning device 10 out of its top receiving position (FIG. 5) into the luggage receiving position (FIG. 7), first the locking bolts 15 of the upper edge area 14 of the end member 12 are moved against the force of the spring 19 and against the traveling direction F and are then moved out of the recesses 16 forwardly (in the forward traveling direction F) wherein the upper edge area 14 of the end member 12 pivots in a first movement about the hinge 27 forwardly and downwardly in the direction of arrow 29 (FIG. 6) so that it can be placed onto the adjoining panel 23 arranged in front (FIG. 6). A securing means 30 between the panels 12 and 23 can become engaged; it secures the parts relative to one another during further movement. In the illustrated embodiment, the securing means 30 is embodied as a lightweight and inexpensive hook and loop fastener.

From this intermediate position, the package of the two movable panels 12, 23 can be pivoted in a second movement about the hinge 28 in the direction of arrow 31 in the upward direction so that it reaches the luggage receiving position illustrated in FIG. 7 in which the size of the trunk 11 is maximized. In this position, the entire partitioning device 10 has been moved forwardly in the traveling direction F so that the farthest rearwardly pointing part is the hinge axis 28. The trunk 11 extends without limitation up to a point directly below the cover 7.

A further securing means 32 can be provided, for example, again in the form of a hook and loop fastener, in order to secure the upwardly pivoted package (12, 23) in the top receiving position. The detachable securing means 32 can be effective between the end member 12 and a lock part 33 for the cover 7.

In order to facilitate the return of the partitioning device 10 into the top receiving position that enlarges the storage compartment 8, the leading adjoining panel 23 has a passage or opening 34 via which the package comprised of the panels 12, 23 can be released from the securing means 32 and pivoted downwardly counter to the direction of arrow 31 before, in accordance with a second separate pivot movement, the end member 12 is pivoted away from the panel 23 in an upward direction counter to the direction of arrow 29.

Each movement direction therefore requires only one pivot movement about the axis 27 or the axis 28. A combined movement is not required.

While specific embodiments of the invention have been shown and described in detail to illustrate the inventive principles, it will be understood that the invention may be embodied otherwise without departing from such principles.

What is claimed is:

1. A convertible vehicle comprising:
   a carbody having a rear area;
   a convertible top connected to the carbody;
   wherein the rear area has a storage compartment for stowing the top and a trunk adjacent to the storage compartment;
   a variable partitioning device separating the trunk and the storage compartment;

wherein the partitioning device has a top receiving position, in which a size of the storage compartment is enlarged, and a luggage receiving position, in which a size of the trunk is enlarged;

wherein the partitioning device comprises a panel-shaped end member that, in the top receiving position, is in an upright position and delimits rearwardly the storage compartment relative to the trunk;

wherein the end member comprises a first edge area that is releasably secured by a releasable connection to the carbody, wherein, for moving the partitioning device into the luggage receiving position, the first edge area is detached from the carbody;

wherein the partitioning device comprises an adjoining panel connected to the end member, wherein the adjoining panel is positioned in front of the end member, viewed in a forward traveling direction of the convertible vehicle, when the partitioning device is in the top receiving position;

wherein, for moving the partitioning device into the luggage receiving position, first the end member is pivoted relative to the adjoining panel in a first movement having a forwardly oriented movement component in the forward traveling direction and, subsequently, the end member and the adjoining panel are moved together in a second movement having a forwardly oriented movement component in the forward traveling direction.

2. The convertible vehicle according to claim 1, wherein the end member has a second edge area that is located opposite the first edge area, wherein the adjoining panel is connected by a pivot connection to the second edge area, wherein the end member is pivoted in the first movement forwardly and downwardly relative to the adjoining panel.

3. The convertible vehicle according to claim 2, further comprising a hook and loop fastener for securing the end member on the adjoining panel after completion of the first movement.

4. The convertible vehicle according to claim 1, wherein the end member and the adjoining panel are pivotable relative to one another about an axis that extends transversely to the forward traveling direction.

5. The convertible vehicle according to claim 1, wherein the end member and the adjoining panel are lightweight construction parts.

6. The convertible vehicle according to claim 2, wherein the end member and the adjoining panel are formed as a textile laminate and wherein the pivot connection is provided by the textile laminate.

7. The convertible vehicle according to claim 1, wherein the adjoining panel in the top receiving position is substantially horizontal and in the luggage receiving position is upright.

8. The convertible vehicle according to claim 1, wherein the releasable connection comprises at least one projecting member connected to the end member and spring means securing the at least one projecting member on the carbody.

9. The convertible vehicle according to claim 8, wherein the releasable connection further comprises at least one switch adapted to prevent the top from opening when the at least one projecting member is not secured by the spring means on the carbody.

10. The convertible vehicle according to claim 1, wherein the partitioning device has only two movable panels in the form of the end member and the adjoining panel.

* * * * *